(12) United States Patent
Watzke

(10) Patent No.: US 11,097,356 B2
(45) Date of Patent: Aug. 24, 2021

(54) CLAMPING DEVICE WITH HYDRAULIC CLAMPING

(71) Applicant: EMUGE-Werk Richard Glimpel GmbH & Co. KG Fabrik fuer Praezisionswerkzeuge, Lauf a. d. Pegnitz (DE)

(72) Inventor: Ruediger Watzke, Neunkirchen am Sand (DE)

(73) Assignee: EMUGE-WERK RICHARD GLIMPEL GMBH & CO. KG FABRIK FUER PRAEZISIONSWERKZEUGE, Lauf A. D. Pegnitz (DE)

( * ) Notice: Subject to any disclaimer, the term of this patent is extended or adjusted under 35 U.S.C. 154(b) by 0 days.

(21) Appl. No.: 16/203,464

(22) Filed: Nov. 28, 2018

(65) Prior Publication Data
US 2019/0176246 A1 Jun. 13, 2019

(30) Foreign Application Priority Data
Dec. 8, 2017 (DE) .................... 10 2017 129 331.0

(51) Int. Cl.
*B23B 31/30* (2006.01)
*B23B 31/20* (2006.01)
*B23B 31/40* (2006.01)

(52) U.S. Cl.
CPC .......... *B23B 31/204* (2013.01); *B23B 31/202* (2013.01); *B23B 31/30* (2013.01);
(Continued)

(58) Field of Classification Search
CPC ..... B23B 31/204; B23B 31/30; B23B 31/402; B23B 31/305; B23B 31/202;
(Continued)

(56) References Cited

U.S. PATENT DOCUMENTS

| 257,157 | A | * | 5/1882 | Faught | .................. | B23B 31/202 |
| | | | | | | 279/46.5 |
| 3,117,797 | A | * | 1/1964 | Buck | ................... | B23B 31/4006 |
| | | | | | | 279/2.03 |

(Continued)

FOREIGN PATENT DOCUMENTS

| CN | 102371375 A | 3/2012 |
| CN | 102407354 A | 4/2012 |

(Continued)

*Primary Examiner* — Eric A. Gates
*Assistant Examiner* — Paul M Janeski
(74) *Attorney, Agent, or Firm* — Workman Nydegger

(57) ABSTRACT

A clamping device for clamping a workpiece to a machine spindle includes at least one clamping bush which extends around a central axis and has at least one clamping surface for the workpiece and at least one clamping body. The clamping bush on a side remote from the clamping surface at least one support surface which extends about the central axis along a helical line. On a side facing, the clamping bush comprises at least one support surface which extends about the central axis along a helical line with a predefined pitch and is inclined at an angle of inclination to a direction axial to the central axis. The clamping body includes a hydraulic chamber in the interior of the clamping body. The clamping device also includes a displacement element, and at least one pressure generator. A clamping force is generatable between the clamping bush and workpiece.

17 Claims, 10 Drawing Sheets

(52) U.S. Cl.
CPC ......... *B23B 31/305* (2013.01); *B23B 31/402* (2013.01); *B23B 2231/0268* (2013.01); *B23B 2231/0272* (2013.01); *B23B 2231/2018* (2013.01)

(58) Field of Classification Search
CPC .... B23B 2231/0268; B23B 2231/0272; B23B 2231/2018; B23B 31/404; B23Q 1/009
See application file for complete search history.

(56) References Cited

U.S. PATENT DOCUMENTS

| | | | | |
|---|---|---|---|---|
| 3,534,970 A | * | 10/1970 | Glimpel | ............... B23B 31/202 279/2.11 |
| 3,731,942 A | * | 5/1973 | Buck | ................... B23B 31/204 279/4.06 |
| 3,762,730 A | * | 10/1973 | Cameron | ............ B23B 31/402 279/2.07 |
| 3,778,071 A | * | 12/1973 | Buck | ................... B23B 31/202 279/16 |
| 3,825,167 A | * | 7/1974 | Komorek | ............ B65H 75/243 279/2.07 |
| 4,393,567 A | | 7/1983 | Disborg | |
| 4,497,498 A | * | 2/1985 | Buck | ................... B23B 31/202 242/573 |
| 2005/0040609 A1 | | 2/2005 | Wu | |

FOREIGN PATENT DOCUMENTS

| | | | | |
|---|---|---|---|---|
| CN | 202356655 U | | 8/2012 | |
| CN | 103447564 A | | 12/2013 | |
| CN | 106694926 A | | 5/2017 | |
| CN | 107363279 A | | 11/2017 | |
| DE | 943872 C | * | 6/1956 | .......... B23B 31/305 |
| DE | 3215899 A1 | | 4/1982 | |
| DE | 102017129331 A1 | | 12/2017 | |
| EP | 1319448 A2 | | 6/2003 | |
| EP | 1663556 A1 | | 6/2006 | |
| EP | 3168486 A1 | | 5/2017 | |
| EP | 3215899 A1 | | 9/2017 | |
| FR | 1564194 A | * | 4/1969 | ......... B23B 31/4013 |
| WO | WO-8001193 A1 | * | 6/1980 | ........... F16D 25/046 |
| WO | 2016/070953 A1 | | 5/2016 | |
| WO | 2005/025790 A1 | | 8/2020 | |

* cited by examiner

Prior Art

CLAMPING DEVICE WITH HYDRAULIC CLAMPING

CROSS-REFERENCE TO RELATED APPLICATIONS

The present invention claims the benefit of priority to German patent Application No. 10 2017 129 331.0, filed Dec. 8, 2017. The entire content of which is incorporated herein by reference.

BACKGROUND OF THE INVENTION

1. Field of the Invention

The invention relates to a clamping device, such as a clamping mandrel or a clamping chuck, for clamping workpieces or tools and to a method for clamping a workpiece or tool with such a clamping device, in particular for a machine spindle.

2. Background

Diverse realizations of clamping devices or clamping tools or clamping systems for clamping workpieces or tools and coupling them to machine spindles for rotating and, where applicable, also feeding in the case of material processing, in particular material machining, are disclosed. The machine spindle is a machine part which is pivotable or rotatable by means of a rotary drive, is mostly adjustable as regards its speed and is frequently also movable in space for feed movements, the specific design of which can be very varied. The clamping device is mostly coupled to the machine spindle but can also be a fixed component of the machine spindle.

The EMUGE Clamping Technology Catalogue 135, High-Performance Clamping Tools dated September 2005 produced by the EMUGE FRANKEN Group discloses various clamping systems which are presented in an overview on pages 10 to 17 and are then detailed on the following pages 18 to 190 in special solutions, in particular for the automobile industry. The play between a clamping sleeve or clamping bush and the workpiece or tool is eliminated during clamping and a radial clamping force is built up.

In the case of the system designated as SP which is shown on page 12 of the catalogue, a clamping sleeve, which is meandered in the longitudinal section, expands in a radial manner as a result of axial force impingement for clamping the workpiece or tool. In the case of the system designated as SZ which is shown according to page 12 of the catalogue, a slotted clamping collet is moved axially in relation to the basic body as a result of an axial force impingement and is widened radially by means of cone surfaces which run in opposition to one another. A special membrane clamping system SM is described on page 14.

A further clamping system which is designated as SG is described on page 13 of the catalogue and comprises a slotted clamping bush which comprises a special buttress thread, by way of which it is screwed onto a corresponding buttress counter thread on the basic body. The wedge-shaped contact surfaces of the two buttress threads, arranged lying one on top of another at the predefined flank angle, are then movable towards one another axially as a result of an axial force impingement and, in the case of such an axial movement in the direction of force, the clamping bush expands radially at the same time on account of the flank angle and as a result clamps the workpiece located outside. The axial force introduced is divided into an axial force component and an outwardly acting radial force component at the buttress thread surfaces which are inclined towards one another at the flank angle. The axial force component increases the transmissible torque and the rigidity of the clamping.

Along with said mechanical clamping systems SP, SZ, SG and SM, also described on page 13 of the catalogue is a hydraulic clamping system SH, by way of which, in particular, long thin-walled workpieces and multiple identical workpieces can be clamped. These are closed systems which are filled with hydraulic oil which is impinged upon with pressure by way of a piston. The pressure which builds up widens the thin-walled expansion zone of an expansion sleeve in a radial manner and clamps the workpiece or workpieces.

DE 10 2013 103 168 B3 discloses a tool holder for a tool which is rotatable about a rotational axis, in particular in the form of a drill, a milling cutter, a reaming tool or a cutter head. In order to enable the tool to be clamped in a manner which influences the vibration behaviour of the tool particularly favourably without accepting any compromises in the processing precision, the tool holder comprises a basic body for coupling the tool holder to the spindle of a power tool and a clamping portion, which is at least connected in one material or at least in one piece thereto and is realized as part of a sleeve for thermally or hydraulically clamping a tool shank or a cutter head. The clamping surfaces, which are pressed radially against one another, are cylindrical and can also comprise open grooves for adjusting the clamping strength. The known tool holder additionally has at least one portion which is formed in one piece and comprises one or a plurality of cavities which are arranged entirely in the interior of the portion and which form an enclave in the formed portion, that is to say are completely closed off in particular to the outside in relation to their surrounding areas. Said cavities comprise excellent damping characteristics and provide the possibility of structural balancing. The cavities have a defined geometric form and extend radially and in the direction of the rotational axis of the tool holder by more than ¹⁄₁₀ of a millimetre, preferably by more than one millimetre. The cavities form, for vibration damping, in each case in particular a channel in the shape of a ring segment which extends concentrically to the rotational axis entirely in the interior of the portion, or in each case an annular channel which is closed completely in the circumferential direction and per se. In another realization, the tool holder comprises a plurality of cavities which extend in the direction parallel to the rotational axis or along a helical line about the rotational axis, which prevents too great a heat transfer during shrinking. The cavities have a round or a rectangular or even a hexagonal cross section in a plane perpendicular to the rotational axis.

A further embodiment according to DE 10 2013 103 168 B3 proposes a tool holder for clamping a tool shank, having a basic body for coupling the tool holder to the spindle of a power tool and a sleeve part connected thereto for securing or shrinking-on a tool shank and at least one portion formed in one piece in which an outside connecting channel is then realized which extends proceeding from the outside circumference of the tool holder into the interior of the portion and widens to form at least one cavity which lies entirely in the interior of the portion such that an adjacent portion, for instance a cover of a bush or a basic body welded to the sleeve part, does not participate in forming the cavity. A relatively large cavity is realized which is filled with a liquid and can be put under hydraulic pressure from the outside by means of a pressure generator via a small opening. A plurality of cavities is preferably arranged here one behind another progressively from inside to outside in the radial direction and at the same time in the direction of the rotational axis in order to generate a distributed pressure action. A network of cavities which communicate fluidically with one another can be put under internal pressure when required. The pressure generator can be, for example, a screw which is actuatable by means of a hex socket, which screw is screwed in a connecting portion, which is provided with an internal thread, to the outside connecting channel and through its screw-in depth determines the pressure which influences the compression available for clamping the tool. The cavities are dimensioned and arranged such that they generate compressive forces which act in a radially inward direction when they are put correspondingly under internal pressure. Said compressive forces strengthen or replace the compression applied by the shrinking-on.

According to DE 10 2013 103 168 B3, to produce said tool holder, in particular a first portion of the tool holder can consist of forged or cast metal and a second portion of the tool holder can consist of a layered metal material, the first portion preferably being the basic body and the second portion preferably the clamping portion. The clamping portion can also be assembled from individual metal layers which are generated as layered metal material. In this case, individual metal layers, metal zones or metal points are melted one after another on top of one another or are welded together or sintered together, as a rule using a laser.

EP 2 347 842 A2 describes an expansion clamping device, in particular expansion clamping chucks or expansion clamping mandrels, having a basic body and an expansion bush which is inserted into the basic body or surrounds said basic body thereby forming a closed pressure chamber. The pressure chamber can be impinged upon with a hydraulic medium thereby elastically deforming the expansion sleeve in order to obtain a clamping action. The expansion bush is soldered to the basic body at least at an axial end region.

EP 2 103 369 B1 discloses an expansion clamping chuck having a chuck body, on the axial end of which is realized a thin-walled expansion bush. The expansion bush is connected to a hydraulic channel which opens out at its one end into a pressure chamber and at its other end is closed by an actuating screw and presses onto a piston inserted into the hydraulic medium channel. A clamping sleeve or clamping collet is inserted into a cone-shaped receiving means of the expansion bush, which clamping sleeve or clamping collet has a conical form at its outer circumference which corresponds to the receiving means and is elastically deformable in the radial direction. As a result of screwing a union nut onto the chuck body, the clamping sleeve is pressed axially onto the receiving means, the cone-shaped outside surface of the clamping sleeve and the cone-shaped inside surface of the receiving means engage one another and interact in such a manner that the axial movement of the clamping sleeve is converted into a radial deformation of the sleeve. As a result of positioning the clamping sleeve axially in a corresponding manner, it is possible to adjust the diameter of the through-bore of the clamping sleeve by means of the union nut such that tool shanks with various diameters are able to be clamped.

WO 2015/166068 A1 discloses a tool with a basic body which comprises a receiving means for another tool and/or a shank for attachment to another tool or to a power tool and which is provided with a channel which is traversable by a coolant. The tool is produced using a laser sintering process. Said process, which is also designated as selective laser sintering, makes it possible to provide a coolant channel in a basic body of a tool. Metal substances are used in powder form during laser sintering and are subject to a sintering process by means of a laser. A metal body is the result. If steel powder is used as starting material, a steel body is the result.

BRIEF SUMMARY OF THE INVENTION

It is now the object of the invention to provide a new clamping device and a new clamping method.

Said object is achieved in particular by the features of the independent claims. Designs and variants are produced in particular from the dependent claims, and additionally from the following description, in particular from the designs and embodiments described herein.

The features and feature combinations described herein according to the underlying invention are not limited by the feature combination or combinations chosen in the claims and the chosen dependencies. Each feature of one claim category can also be claimed in another claim category. In addition, each feature in the patent claims can be claimed, also independently of the respective claim-related dependency, for example in an arbitrary combination with one feature or with a plurality of other features of the claims or of the following description. In addition, each feature disclosed in the following description and/or the accompanying drawings and/or described or disclosed in conjunction with the drawings is claimed per se, independently of or separately from the context in which it stands, on its own or in any combination with one or a plurality of other features which is or are described or disclosed in the claims, the description and/or the drawings, in particular to the extent to which the respective feature provides a contribution to the solution to the underlying object. In particular, each of the designs described below or each of the described exemplary embodiments and the features thereof can also be claimed separately per se and/or in arbitrary combinations.

One embodiment according to the invention proposes a clamping device for clamping (or: for clamping-in or clamping-on) a (rotating or non-rotating) workpiece or a tool and in particular also for coupling the workpiece or the tool to a (rotating or non-rotating) machine spindle, in particular of a power tool, the clamping device comprising the features of claim 1 or the following features:

a) at least one clamping bush (or: clamping sleeve) which extends around a central axis and has at least one clamping surface for the workpiece or tool (or: has at least one clamping surface for interacting, in particular abutting in a non-positively locking manner against the workpiece or tool by way of at least one counter clamping surface) and b) at least one clamping body (or: clamping element), c) wherein the clamping bush, on a side remote from its at least one clamping surface, comprises at least one support surface which extends about the central axis along a helical line (or: as or in the manner of a thread portion) at a predefined pitch and at the same time is inclined at an angle of inclination to a direction which is axial to the central axis, d) wherein the clamping body, on a side facing the clamping bush, comprises at least one support surface which extends about the central axis along a helical line (or: as or in the manner of a thread portion) at a predefined pitch and at the same time is inclined at an angle of inclination to a direction which is axial to the central axis, e) wherein or such that the support surfaces of clamping body and clamping bush, which face one another, are movable or are moved into contact with one another and/or are movable slidingly towards one another in the axial direction by means of at least one displacement element as a result of an axial displacement movement along an axial displacement path, as a result of which the diameter of the clamping surface is modifiable or is modified in a direction radial to the central axis or as a result of which, with a clamping surface of the clamping bush already abutting against the workpiece or tool, a radial clamping force is generatable or generated on the clamping surface between the clamping bush, on the one hand, and the workpiece or tool on the other hand, f) wherein the clamping body and/or the clamping bush includes or include over and above this one or a plurality of hydraulic chambers which is or are realized in the interior of the clamping body or of the clamping bush and is or are filled with a hydraulic medium, g) wherein the hydraulic medium can be impinged upon or is impinged upon with hydraulic pressure in at least one of the hydraulic chambers by means of at least one pressure generator, which hydraulic pressure, with the support surfaces of clamping body and clamping bush lying one on top of the other, generates a hydraulic radial compressive force on the support surfaces of clamping body and clamping bush lying one on top of the other, wherein, once again, as a result of said hydraulic radial compressive force, with the clamping surface already abutting against the workpiece or tool, a radial hydraulic clamping force is generatable or generated on the clamping surface between clamping bush, on the one hand, and workpiece or tool on the other hand.

The support surfaces, in other definitions which are alternative to the definition "inclined to a direction which is axial to the central axis", can also be inclined radially inward or outward with respect to an imaginary or geometric cylindrical surface which extends about the central axis as a cylinder axis or can be inclined to a direction parallel to the central axis in each section along a section plane (longitudinal section) which includes the central axis.

The support surfaces are realized flat in a preferred manner and are inclined at a constant angle of inclination, in particular in a wedge-shaped or saw-tooth-like manner and preferably on a helical cone surface, but can also have a varying inclination at a varying angle of inclination, in particular with a certain light curvature.

In one embodiment, a mechanical clamping force is generated and the hydraulic clamping force is generated in addition to the mechanical clamping force. Generally speaking, the hydraulic clamping force is rectified to the mechanical clamping force.

The clamping device, however, can also clamp in a purely mechanical manner or in a purely hydraulic manner.

The combination of the two clamping principles is preferred. With hydraulic clamping, it is possible to compensate advantageously for tolerances on a tool shank to be clamped or a workpiece to be machined which cannot be compensated for in the case of a mechanical clamping principle. Mechanical clamping by means of the displacement element can also generate in particular an axial clamping force, as a result of which greater clamping rigidity is able to be achieved.

In a preferred embodiment, the amount of hydraulic clamping force is adjustable or is adjusted to at least 2 times or at least 5 times or at least 20 times the mechanical clamping force.

In one embodiment, corresponding support surfaces of clamping body and clamping bush, as a result of a screwing movement into one another adapted to the pitch thereof, are movable or rotatable or screwable into an engagement position in which the support surfaces lie opposite one another at least in part and/or are moved into contact.

The axial displacement movement to generate the radial mechanical clamping force can then be effected from said engagement position and the impinging of the chamber or chambers with the hydraulic pressure is then effected by means of the pressure generator to generate the hydraulic clamping force.

In a preferred embodiment, intermediate webs (or: partition webs) are arranged between the hydraulic chambers. The axial dimension or thickness of the intermediate webs is in particular smaller, preferably in particular smaller by at least a factor of 4, than an axial dimension or length of the chambers. In particular, the intermediate webs are arranged below the support surface or support surfaces at an axial distance which corresponds to a multiple, in particular double, the pitch of the support surface or support surfaces.

As a result of providing one or a plurality of webs, the wall, which transmits the force generated by the expansion onto the clamping bush, can be divided into various part regions, from each of which varying levels of forces can be transmitted. The wall can therefore be realized such that in certain regions, that is to say where the expansion is inhibited, a lower force is transmitted and in regions where the expansion is not inhibited, a higher force is transmitted. In addition, the hydraulic chambers can also be realized in a sturdier manner as a result of the webs, in particular in relation to a variation in stress in use such that a constant pressure build up is ensured. Where applicable, the chambers provided with webs can tolerate higher hydraulic pressure than disclosed in the prior art. A higher clamping pressure can be made available in portions for the item to be clamped as a result.

In an advantageous embodiment, a membrane-like wall (or expansion membrane) of the clamping body or of the clamping bush is formed between the chamber or chambers and the support surface or support surfaces which is deformable or expandable in the radial direction with the support surface or support surfaces as a result of the hydraulic pressure.

The membrane-like wall is preferably supported on the intermediate webs.

The wall can be realized separately from the webs and only rest on the webs such that the wall is supported on the webs at least in the radial direction, preferably such that the wall is movable relative to the webs.

However, the wall can also be connected to the intermediate webs, in particular can be welded or soldered or bonded to the webs.

If the webs are connected to the wall in one connecting region or a plurality of connecting regions, the expansion in said connecting region or connecting regions can be reduced or completely prevented. As a result, particularly advantageously determined expansion zones which are defined in space or surface area or zones of varying pressure can be generated on the outside of the wall.

In one embodiment, at least one of the intermediate webs is realized in a closed manner like a ring about the entire circumference, in particular extending perpendicularly to the central axis.

In a further embodiment, at least one of the intermediate webs is realized extending in a twisted or spiral or helical manner, in particular about the central axis, in particular at the same angle of twist of between 40° and 80°, in particular of between 50° and 70°.

It is also possible to provide a plurality of such twisted intermediate webs which can be arranged in particular at the identical angle of twist, for example as a multi-start thread, or at different angles of twist, in particular directed in opposite directions to one another, for example in a crosswise realization. For example, no hydraulic medium can be provided here between one web pair and hydraulic medium can be provided between the next web pair following the first web pair in the axial direction. Expansion zones, which are separated from one another by non-expanded zones, can be created in this way.

In one embodiment, at least one of the intermediate webs extends only over part of the circumference.

The intermediate web or intermediate webs are arranged or realized in particular on a shell surface, in particular a cylindrical shell surface, of the clamping body or of the clamping bush.

In one embodiment, at least two or a plurality of intermediate webs are arranged intersecting or realizing intersections or in the shape of a diamond or of a honeycomb. This is particularly sturdy.

In one embodiment, at least one of the chambers is closed in a ring-like manner about the entire circumference, in particular is realized perpendicularly to the central axis.

In another embodiment, at least one of the chambers is realized extending spirally or helically, in particular about the central axis.

In another embodiment, at least one of the chambers is realized extending only over part of the circumference and/or in a cushion-shaped and/or diamond-shaped and/or honeycomb-shaped manner.

With regard to the geometric dimensions of the hydraulic chambers, at least one or a combination of the following features can be chosen:

a) the chambers have a, in particular identical, radial dimension or height which is in particular greater, preferably greater by at least the factor of 2.5, than a radial thickness of the membrane-like wall, b) at least the axially inside chambers have the identical axial dimension, c) the axially outside chambers have a smaller axial dimension than the axial dimension of the axially inside chambers, d) the axial dimensions of the chambers are greater than the pitch of the support surface or support surfaces, but smaller than double the pitch.

In the hydraulic system, in one embodiment, at least one or a plurality of the chambers is or are fluidically connected to the at least one pressure generator via at least one hydraulic channel. In addition, at least two of the chambers are preferably realized so as to communicate fluidically with one another, in particular by means of intermediate channels or openings, in particular in or between the intermediate webs.

As a result of the quantity and size of the chambers, it is possible to adjust how many expansion zones are provided on the support surfaces and therefore on the clamping surface. Smaller-scale explosion zones can be advantageous, for example, for the clamping of workpieces or tools with a high level of surface roughness as the clamping then acts with a correspondingly small-scale force progression such that surface roughness is compensated for and uniform clamping is achieved. Relatively large expansion zones can be advantageous when a high clamping force is desired Chambers that are connected together fluidically facilitate and improve the pressure build-up in the chambers and enable pressure equalization between the individual chambers which contributes to the stabilizing of the clamping force. As an alternative to this or in addition to it, it is possible to separate certain or all the chambers fluidically from one another such that not all, but only a certain number of chambers are impinged upon with pressure.

In one embodiment, at least one cross section perpendicular to the axial direction and/or one longitudinal section parallel to or in said axial direction of one or a plurality of chambers is greater than the web or the webs.

A method for clamping a workpiece or tool with a clamping device according to one of the embodiments according to the invention includes in particular the following method steps:

a) move the corresponding support surfaces of clamping body and clamping bush as a result of a screwing movement into one another, which is adapted to the pitch thereof, into an engagement position in which the support surfaces are situated opposite one another at least in part and/or are moved into contact, b) generate an axial displacement movement from said engagement position to generate the radial mechanical clamping force, c) then impinge upon the chamber or chambers with the hydraulic pressure by means of the pressure generator to generate the hydraulic clamping force.

In one embodiment, chambers that are fluidically tight with the webs are or will be produced as a result of realizing the clamping body in one piece with the webs, the force of which chambers is able to be transmitted at the same time in a favourable manner to the clamping bush. Realizing the clamping body in one piece with the webs additionally enables the clamping body to have a particularly sturdy and solid structure.

In embodiments, individual components of the clamping device, preferably of the clamping body, are manufactured entirely, or at least in part, by way of additive manufacturing processes, especially in a metal material such as a metal or a metal alloy, that is to say in a forming process or as a result of forming.

In particular, it is possible to use one of the manufacturing processes or a combination of manufacturing processes which are disclosed in the article by C. Körner—Additive manufacturing of metallic components by selective electron beam melting—a review, International Materials Reviews, 61:5, 2016, pages 361-377, or in the article by Lawrence E. Murr—Fabrication of Metal and Alloy Components by Additive Manufacturing: Examples of 3D Materials Science, Journal of Materials Research and Technology, Elsevier, 2012, pages 42-54, or also known 3D printing processes, in particular a selective laser sintering process or a selective laser melting process or a process for laser deposit welding.

In one embodiment, when the webs are being produced in said manner, but also other components of the clamping body that are producible using the forming process, in the forming process, for example in a laser sintering process, metal powder is accumulated which is then solidified in precisely the correct position as a result of laser radiation. For example, metal powder with grain sizes of approximately 1/100 mm can be used during laser deposit welding. Powder layers within the range of a minimum thickness of 1/10 mm can be achieved with such a powder during laser deposit welding.

Along with the solidified metal powder, however, loose or pourable or non-solidified metal powder frequently remains additionally on or in the component and, above all, should be removed out of the chambers. To this end, it is advantageous when breaks or openings are provided between the webs and/or in the webs, through which breaks or openings the metal powder is able to trickle out of the chambers, or through which the metal powder is able to be removed, in particular drawn off or shaken out. In the case of a non-concentric configuration, that is to say a twisted, helical or spiral configuration, it can be advantageous when the webs themselves are realized continuously, that is to say free of openings, but end at a spacing from a wall that lies at the back when viewed axially, that is to say on a side (end side) facing the machine-side connecting surface, or in the event of a clamping chuck, facing a machine side and/or from a wall that lies at the front when viewed axially, that is to say on a side (end side) of the clamping means lying opposite the machine-side connecting surface. In this way it is made possible, after production of the hollow chambers which are certainly closed in a substantially fluidically tight manner, for metal powder to be able to escape along the twisted webs and through the openings between the webs and walls located axially at the front and/or axially at the rear. Located axially at the front or the front axial end of the clamping means is to be understood, in particular, as the machine-side end of the clamping means, for example including the machine-side clamping surface, whereas located axially at the rear or the rear axial end of the clamping means is to be understood as the end of the clamping means which realizes the clamping side, or the end from which or on which the tool or workpiece is clampable.

In one embodiment, when generating the clamping body, a, preferably substantially conical or cylindrical, blank, which is produced in particular as a result of forging and/or machining, can be provided which comprises a radially outside top surface or radially inside top surface, and the web or webs are then generated on the top surface as a result of the forming process.

A particularly simple method of production is achieved when a blank, which is produced in a first method step as a result of forging and/or machining, is provided in a first step. Said blank can be provided with a top surface which can form the basic surface or basic structure on which further structures are built as a result of forming or also as a result of other processes.

A wall is expediently generated on the clamping body, in particular as a result of a forming process, preferably such that the web or webs are connected in a surface-to-surface bond and/or, in particular as regards the material, in one piece with the wall, in particular such that the web or webs realize chamber walls of the chamber or chambers with the wall.

Such a wall can be, in particular, the already mentioned membrane-like wall or expansion membrane. If the wall is generated in a substance-to-substance bond or in one piece with the web or webs as a result of, in particular the same, forming process or in the same forming step, the connection between web and wall is very strong and it is also possible to produce thin-walled walls.

If the chambers are generated entirely in one material layer in one forming process, it is thus possible very flexibly to produce in particular various cross sections of the chambers or of the webs. In other words, variously shaped hollow chambers are able to be produced in a flexible manner.

The webs can also be produced, however, as a result of material removal such as electrical discharge machining or milling or turning.

The chamber or chambers has or have in particular a rectangular cross section in an axial section. A rectangular cross section of the chambers enables advantageous pressure propagation, in particular when the long side of the cross section is oriented substantially parallel to the wall of the clamping body.

The advantage of a cylindrical clamping body in cooperation with a hollow-cylindrical clamping bush compared to a cone-shaped realization of the clamping body and/or of the clamping bush is that the usable dimensions of the inside and outside diameter of the clamping bush are not predefined by the cone shape of the clamping body, but that the inside or outside diameter can be adapted in a flexible manner to the clamping task. In addition, compared to a cone shape, it is possible for the hydraulic force generating means also to be able to make the clamping force available exclusively without mechanical force generating means providing a main clamping force. As an alternative to this, it is possible for the clamping body and/or the clamping bush to be realized in a tapered or conical manner.

Problems with purely mechanical clamping as in the case of a buttress thread are avoided according to the invention, in particular a stick slip, i.e. friction in the thread and static friction as well as the breakaway torque is reduced and only a small mechanical clamping force is necessary, whilst the essential proportion of clamping force is supplied by the hydraulics.

BRIEF DESCRIPTION OF THE DRAWINGS

The invention is explained in more detail below by way of exemplary embodiments. In this case, reference is also made to the schematic representations in the drawings in which.

Parts and sizes which correspond to one another are provided with the same reference symbols in FIGS. 1 to 12.

DETAILED DESCRIPTION

Figure 1:
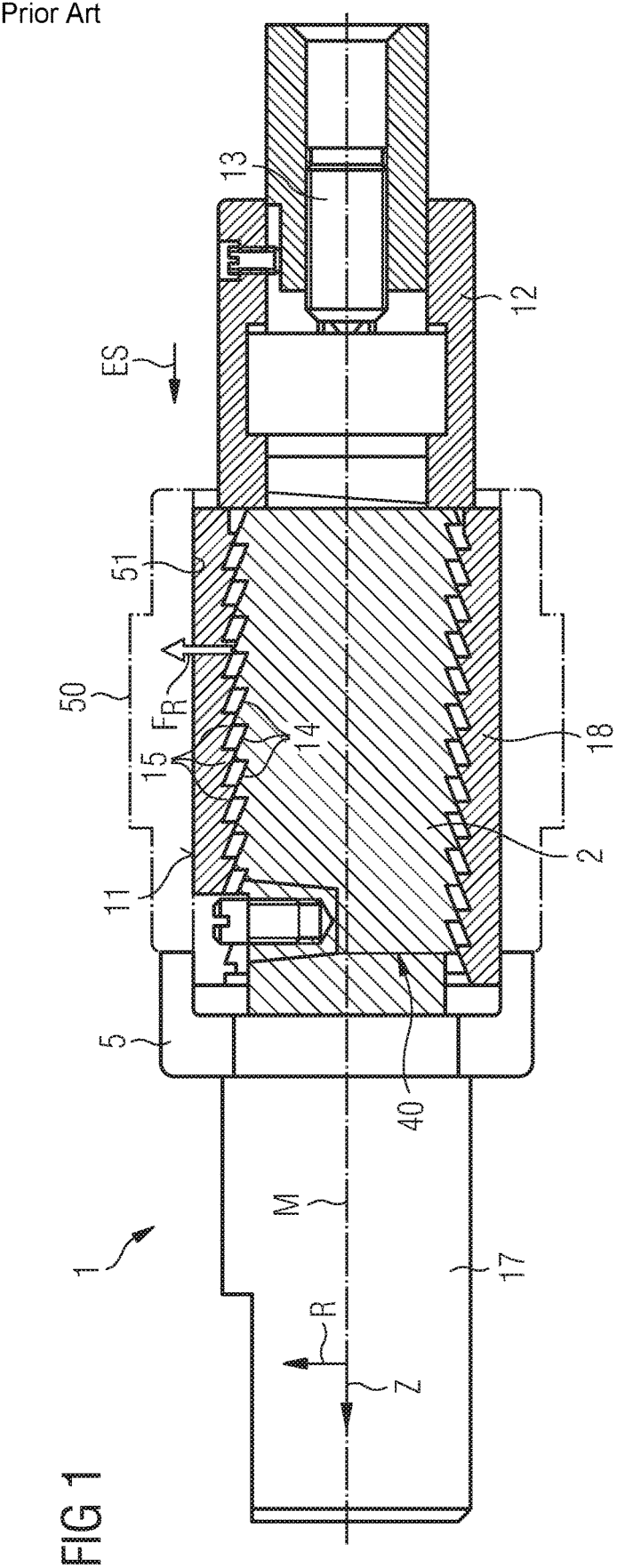
FIG. 1 shows a longitudinal section of a clamping device according to the prior art.

FIG. 1 shows a longitudinal section of a clamping device 1 as is known in the prior art. The clamping device 1 is provided for clamping (or: holding in non-positive manner) a workpiece 50 which is indicated by dot-dash lines, in particular for the purposes of coupling the workpiece 50 to a machine spindle (not shown), or to a rotating or non-rotating part of a processing machine or power tool, for or during processing of the workpiece 50.

In a clamping region 40, in which the clamping forces are made available or generated for the clamping of the workpiece 50, the clamping device 1 includes a clamping bush 18 with a clamping surface 11 which is directed or points radially outward in the R direction or is arranged on an outside surface or shell surface or outside wall and which abuts against a counter clamping surface 51 of the workpiece 50 for connecting or clamping in a non-positive manner, and with a clamping body 2 for clamping the clamping bush 18 as a result of exerting a clamping force on clamping surface 11 and counter clamping surface 51. With reference to a common centre axis or central axis M of the clamping device 1 and coaxially to the clamping body 2, the sleeve-shaped clamping bush 18 is arranged around said clamping body or surrounding said clamping body. Generally speaking, the clamping bush 18 is slotted or provided with expansion slots to facilitate the extensibility.

In addition, the clamping device 1 includes a shank part 17 for connecting or coupling with a machine spindle (not shown) in a manner known per se.

The clamping force is generated by means of at least one support element 14 on an outside surface or shell surface or outside wall of the clamping body 7 and at least one corresponding or interacting support element 15 on an inside surface or inside wall of the clamping bush 18 which is directed radially inward.

The support elements 14 and 15 are inclined in a wedge-shaped or saw-tooth-like manner with respect to the centre axis M of the clamping device 1 or of the clamping body 7 and of the clamping bush 8.

A mechanical clamping element 12 can be displaced axially or linearly in the Z direction, for example by means of a threaded pin 13, in a clamping movement direction ES parallel to the centre axis M such that it also entrains the clamping bush 18 linearly in the clamping movement direction ES as a result of surface contact or after impact of an end-face shear surface 19 with an end surface of the clamping bush 18. The clamping element 12 and the threaded pin 13 together form an example of a displacement element.

The workpiece 50, arranged around the clamping bush 18, is held in position axially by a stop on a ring body 5. If the clamping bush 18 is then displaced linearly in the clamping movement direction ES, the support element or support elements 15 of the clamping bush 18 slides or slide on the support element or support elements 14 of the clamping body 2. This leads to a widening of the clamping bush 18 up to a dimension where its clamping surface 11 strikes against the counter clamping surface 51 of the workpiece 50 and a defined clamping force then builds up on the clamping surfaces 11 and 51 as a result of a radial compressive force on the support elements 14 and 15.

As an alternative to this, the clamping body 2 can also be displaced axially relative to the clamping bush 18 by means of the clamping element 12.

The method of operation of the support elements 14 and 15 is explained in more detail below by way of FIG. 2.

Figure 2:
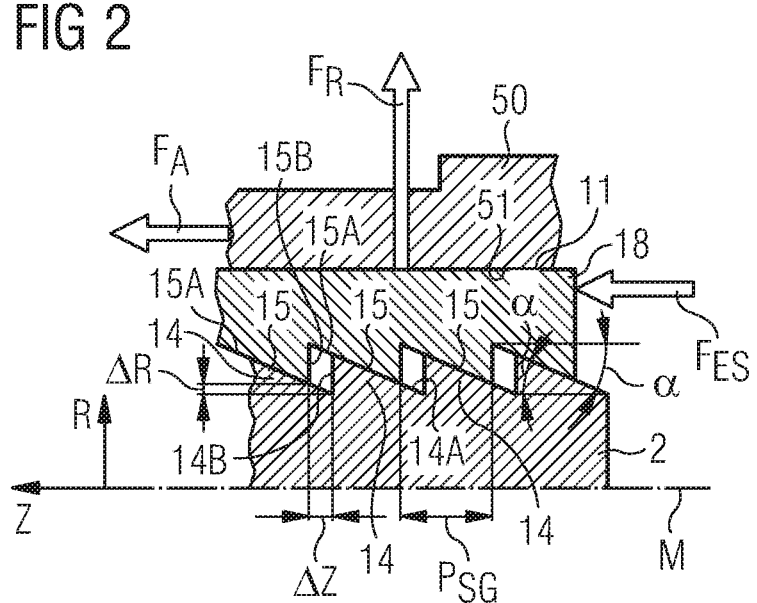
FIG. 2 shows a sectional representation schematically of the principle of mechanical clamping.

FIG. 2 shows a longitudinal section in the axial direction of the principle of clamping or holding, in particular in the manner of a buttress thread or with a realization according to FIG. 1, which principle is transferrable or applicable to all embodiments according to the invention. In the example in FIG. 2, a workpiece 50 is clamped by being impinged upon radially from the inside by means of a clamping bush 18 by the radial clamping force FR which acts radially outward in the direction of the radial component or coordinate R, analogously to a clamping mandrel. The reverse clamping from outside to inside by a clamping bush surrounding the workpiece or tool from the outside is naturally also possible, in particular as a clamping chuck.

The clamping bush 18 is moved axially by means of an insertion force FES which acts in the Z direction or axially to the central axis M, and as a result at the same time is deformed or clamped radially outward. To this end, in the longitudinal section one or a plurality of wedge-shaped support surfaces 15A of one or a plurality of support elements 15 of the clamping bush 18, which are directed at an angle of inclination $\alpha$ to the axial direction or parallel to the central axis M, are supported on one support surface or a plurality of support surfaces 14A, which are inclined correspondingly at an angle of inclination $\alpha$ of one or a plurality of support elements 14 of the clamping body 2 and slide along on said support surface or support surfaces at an angle of inclination $\alpha$. In a rest state or released state, the radially or approximately radially extending end surface or end surfaces 15B of the support element or support elements 15 can knock against one another by way of end surface or end surfaces 14B of the adjacent support element or support elements 14 and the support surfaces 14A and 15A can also still be slightly spaced apart, that is to say not lying one on top of the other or arranged together with play. In the state shown, the end surfaces 15B of the corresponding end surfaces 14B, however, have been displaced towards one another in the Z direction by a displacement path $\Delta Z$ as a result of the effect of the clamping force FES and, on account of the inclination by the angle of inclination $\alpha$, the support element or support elements 15 on the support element or support elements 14 have crept or been urged radially outward by the radial path (or: deflection) $\Delta R$, the radial path $\Delta R$ being assigned to the axial path $\Delta Z$ in dependence on the angle of inclination $\alpha$ corresponding to $\Delta R = \Delta Z \tan \alpha$. As a result of said radial movement or deflection or expansion outward by the radial path $\Delta R$, the entire clamping bush 18 is clamped or deflected or expanded outward by $\Delta R$ and, as a result, exerts the radial compressive force FR via the outwardly pointing support surface or support surfaces 14A of the clamping body 2 onto the inwardly pointing support surface or support surfaces 15A of the clamping bush 18, which finally acts outwardly as a clamping force on the workpiece 50 on the oppositely situated clamping surfaces 11 and 51 which are built up physically as a result of the deformation and elastic restoring forces between clamping bush 18 and workpiece 50 and the action=reaction law. An axial force component FA, which increases the transmissible torque and rigidity, is exerted at the same time.

So that the clamping bush 18 can be mounted on the clamping body 2 simply without deformation or two-part or multi-part design and in this case the support elements 15 can be positioned beyond the support elements 14 in the Z direction, in a preferred embodiment the support elements 15 and 14 are realized or arranged with their respective support surfaces 15A and 14A in each case in the form of a thread or extending along a helical curve or helix, the pitch PSG thereof corresponding to the distances between the support elements 14 or 15 in the longitudinal section in FIG. 2. A helical arrangement of multiple support elements 14 or 15 one behind another is possible. Preferably, however, support elements 15 and 14 or support surfaces 15A and 14A which are continuous or break-free along the thread or the helical curve are provided. A continuous support surface 15A, which is realized helically with the pitch PSG and is inclined at the angle of inclination $\alpha$, of a correspondingly continuous support element 15 is therefore realized in a preferred manner on the clamping bush 18 and a continuous support surface 14A, which is realized helically with the pitch PSG and is inclined at the angle of inclination α, of a correspondingly continuous support element 14 on the clamping body 2. As a result, the support elements 14 and 15 and the clamping bush 18 and the clamping body 2 can be rotated into one another or screwed onto or into one another as a result of a screwing movement or rotating movement as in the case of an internal or external thread. In this case, once screwed in, the two support threads or surfaces 14A and 15A initially lie loosely one on top of the other without any significant compressive force. The insertion force FES, which displaces the two support surfaces 14A and 15A towards one another axially in the Z direction in an axial displacement movement, is then exerted and as a result initially moves them into contact with one another and then, as a result of the inclination of the support surfaces 14A and 15A, results in a radial compressive force FR with which the support surfaces 14A and 15A are pressed against one another, and accordingly in the radial clamping force outward onto the workpiece 50. On account of the wedge-shaped or saw-tooth-like shape of the support surface or support surfaces 14A and 15A, such a thread is also called a buttress or saw tooth thread. Deviating forms are also possible, however, in particular also support elements 14 and 15 or support surfaces 14A and 15A which are curved or provided with a plurality of level surfaces.

In the embodiments shown and described by way of FIGS. 1 and 2, the workpiece 50 is clamped from the inside, i.e. the clamping device projects through the workpiece 50. Such a clamping device is also called a clamping mandrel. As an alternative to this, a workpiece or tool can also be clamped from the outside, i.e. the clamping device surrounds the workpiece or tool. Such a clamping device is also called a clamping chuck. Here, the sequence of clamping surfaces and support elements is reversed in the radial direction compared to a clamping mandrel according to FIG. 1 and FIG. 2, i.e. from the sequence from outside to inside the sequence is now from inside to outside.

According to the invention, a clamping device, as has been described, for example, by way of FIG. 1 and FIG. 2 or according to the EMUGE embodiment SG described in the introduction, is now improved and further developed as a result of hydraulic clamping being provided additionally or preferably primarily by means of chambers which are impinged upon hydraulically. To this end, hydraulic chambers, which are filled with a hydraulic medium such as hydraulic oil, are provided in the clamping body 2 or in the clamping bush 18 in the vicinity of the support surfaces 14A or 15A. The hydraulic chambers are filled with hydraulic medium and impinged upon with hydraulic pressure which generates an additional hydraulic compressive force on the support surfaces and, as a result, an additional hydraulic clamping force on clamping surface and counter clamping surface.

Figure 3:
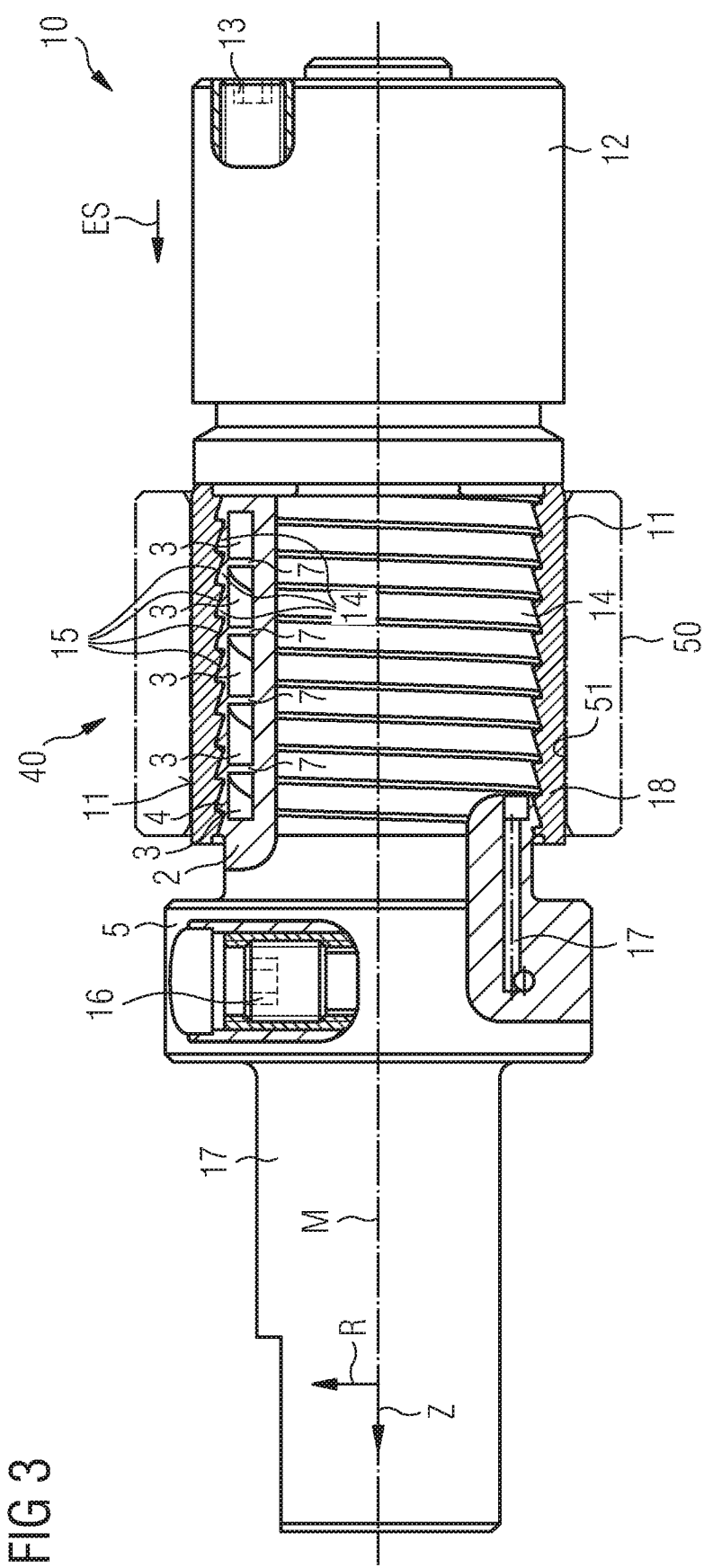
FIG. 3 shows a partially sectioned side view of a clamping device according to a first embodiment of the invention.
Figure 4:
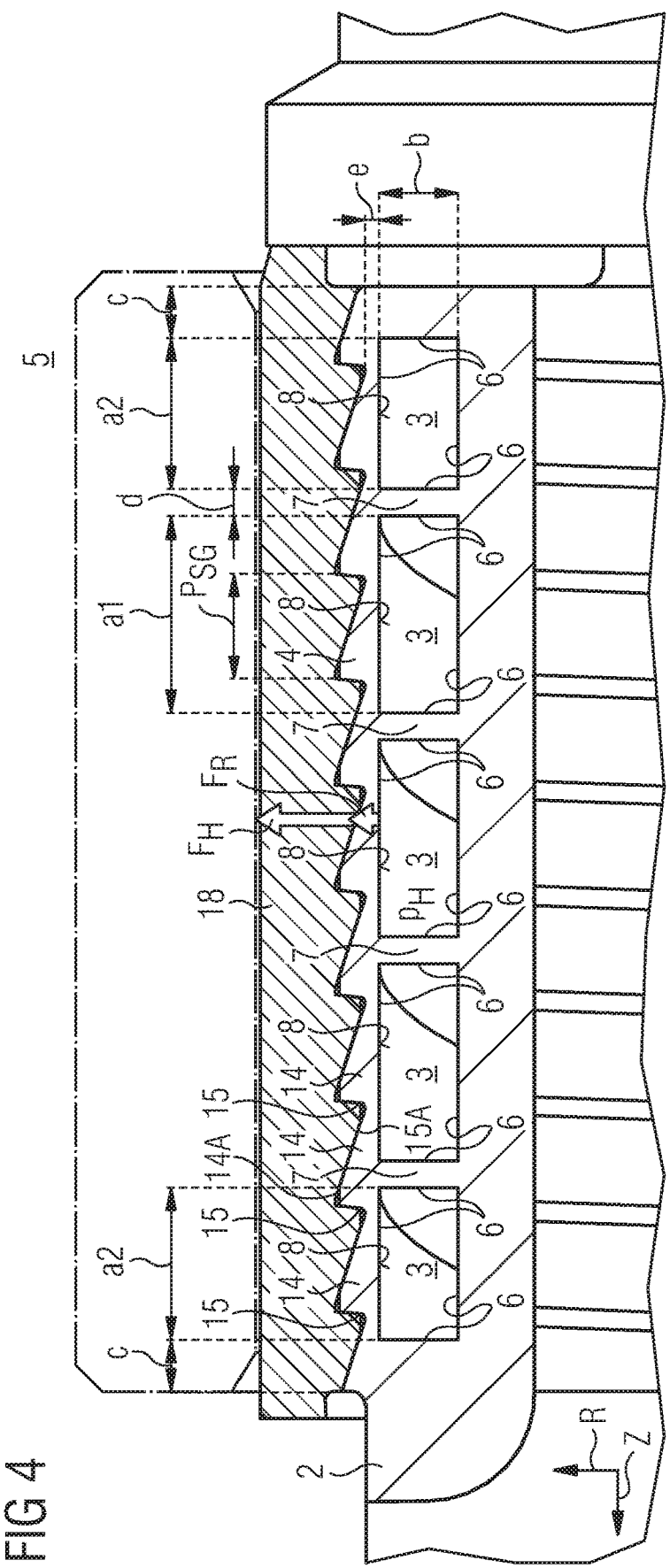
FIG. 4 shows an enlarged detail of the clamping device according to FIG. 3.

In a partially sectioned side view, FIG. 3 shows an exemplary embodiment of a clamping device 10 with such hydraulic chambers 3, here in the clamping body 2. FIG. 4 shows an enlarged detail of the partially sectioned part in FIG. 3, in which the chambers 3 are visible.

In a clamping region 40, the clamping device 10 comprises a clamping body 2 which is arranged in FIGS. 1 and 2 inside a clamping sleeve 18, preferably about a common central axis M. A workpiece 50 is once again arranged with its counter clamping surface 51 on a (here outer) clamping surface 11 of the clamping sleeve 18. On the (inner) side remote from the clamping 11, the clamping bush 18 once again comprises the support element or support elements 14.

In contrast to FIG. 1, in the realization according to the invention according to FIGS. 3 and 4, hydraulic chambers 3, which are filled with hydraulic oil or a liquid hydraulic medium such as a hydraulic oil which is under a hydraulic pressure of pH, are provided in the interior of the clamping body 2.

The chambers 3 are each surrounded by a wall 6 which is pressure-tight in relation to the hydraulic pressure pH and the hydraulic medium.

Intermediate webs or partition webs 7, which comprise an axial dimension or thickness d, are arranged in the axial or Z direction parallel to the central axis A between the chambers 3.

In the exemplary embodiment according to FIG. 4, the chambers 3 all have the identical radial dimension or height b.

In the outward radial direction R, the chambers 3 are arranged at a relatively small radial distance e from the support element or the support elements 14, i.e. the point thereof arranged the furthest radially inward, such that, with the region of the clamping body 2 lying in between, a comparatively thin membrane-like wall 8 is formed, on which the support element or support elements 14 are arranged. The dimension e is chosen, in particular, to be approximately identical to the dimension b. As a result of the increase in pressure in the chambers 3, the thin wall 8 is pressed outward in the radial direction R. The intermediate webs 7 support the wall 8.

The inner three chambers 3 preferably have the identical axial dimension or length a1 and the two outer chambers 3 preferably have a smaller axial dimension a2<a1.

The axial thickness d of the intermediate webs 7 is smaller, in particular smaller by a factor of at least 4, preferably at least 5, than the axial dimensions a1 of the chambers 3. The axial thickness d of the intermediate webs 7 is additionally generally chosen to be smaller, in particular clearly smaller than the pitch PSG, for example smaller by a factor of between 2 and 10. For example, d can be chosen to be between 1 and 3 mm absolutely.

Both axial dimensions a1 and a2 are greater than the pitch PSG, but smaller than 2 PSG, such that a chamber 3 extends entirely below the support surface 14A of a saw tooth or support element 14 or threaded portion in a longitudinal section and still projects into the region below the adjacent saw teeth or support elements 14 or threaded portions in an adjacent longitudinal section.

Below every other support surface 14A is consequently an intermediate web 7 which at the same time forms non-hydraulic mechanical support and clamping, in which the wall region 8 is deformed less. The remaining edge to the end of the region with the support element or support elements 14 has the axial dimension C and also deforms less.

When viewed more generally, the intermediate webs 7 are arranged below the support surface or support surfaces 14A at an axial distance which corresponds to a multiple or to a whole-number multiple, in particular double, the pitch PSG of the support surface or support surfaces 14A.

In the case shown in FIGS. 3 and 4, five expansion zones arranged about the centre axis M are generated in a preferred manner on the wall 8, the first and last expansion zone in the axial direction comprising a smaller width than the three expansion zones lying between them. The individual expansion zones are defined by the regions in which the webs 7 are arranged, the webs 7 reducing or preventing the expansion of the wall 8 at the point where the webs 7 are connected to the wall 8.

The named dimensions can be chosen such as specified in all the embodiments but can also be chosen in another manner and differently from one another in dependence on the desired clamping and the workpiece or tool to be clamped. In addition, the chambers 3 can also have cross sections other than the rectangular cross sections shown, for example round or oval or dumbbell-shaped cross sections.

In a preferred embodiment, the hydraulic chambers 3 are fluidically connected to at least one pressure generator 16, for example provided on a ring body 5, by means of at least one hydraulic channel 17. The channel 17 and the chambers 3 are closed fluidically in relation to the surrounding area for this purpose or form a closed hydraulic system such that it is possible to adjust the hydraulic pressure pH in the chambers 3 by means of the pressure generator 16 substantially without leakages. The pressure generator 16 can be, in particular, a threaded screw which reduces the fluid space of the channel 17 when screwed in and as a result can increase the hydraulic pressure in the channel 17 and the chambers 3 connected thereto and when unscrewed can reduce it again correspondingly. However, an actively controllable pressure generator can also be provided, for example an adjustable pressure piston or the like. At least some or all of the chambers 3 can be realized so as to communicate fluidically with one another by means of intermediate channels or openings, in particular in or between the partition walls or intermediate webs 7, or in the form of one or a plurality of circumferential chambers 3 or, however, each being connected individually to the channel 17 and/or the pressure generator 16.

Figure 5:
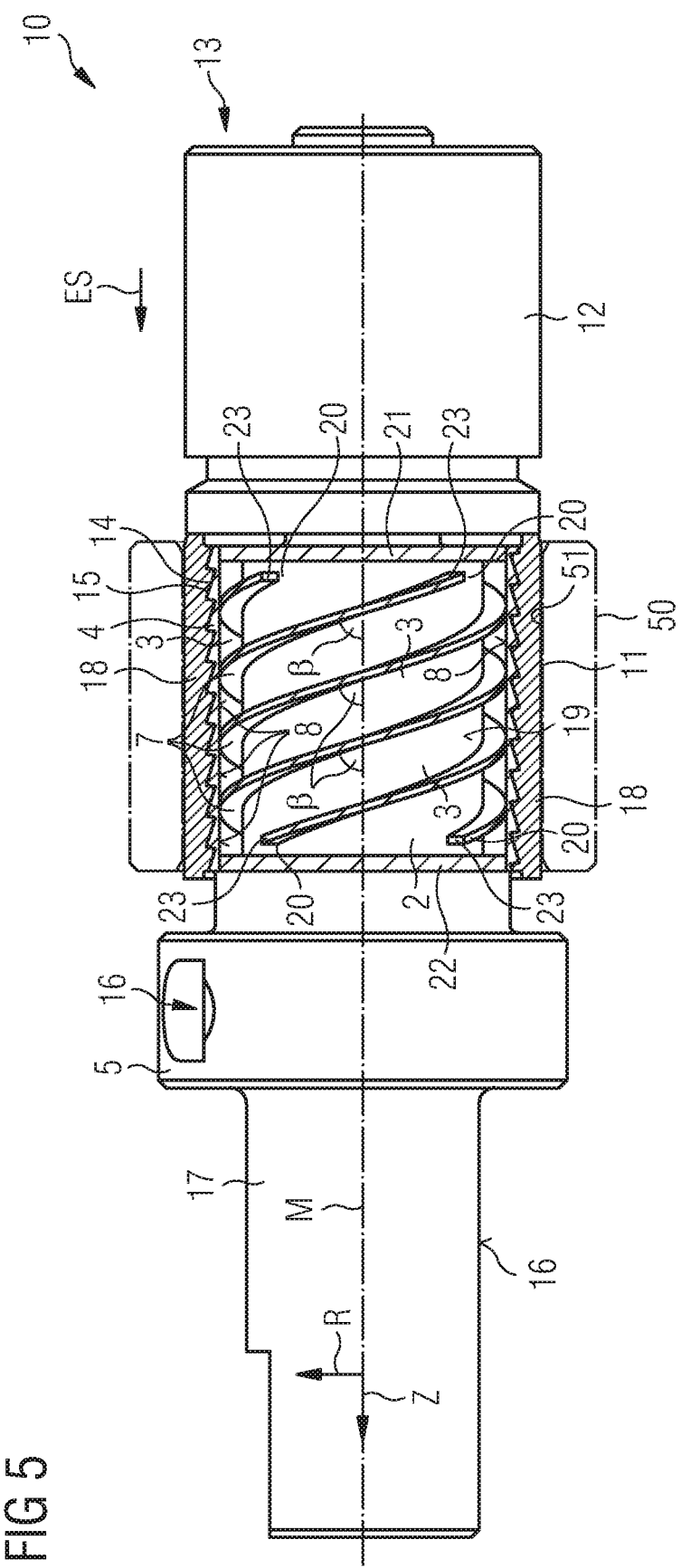
FIG. 5 shows a partially sectioned side view of a clamping device according to a second embodiment of the invention.
Figure 6:
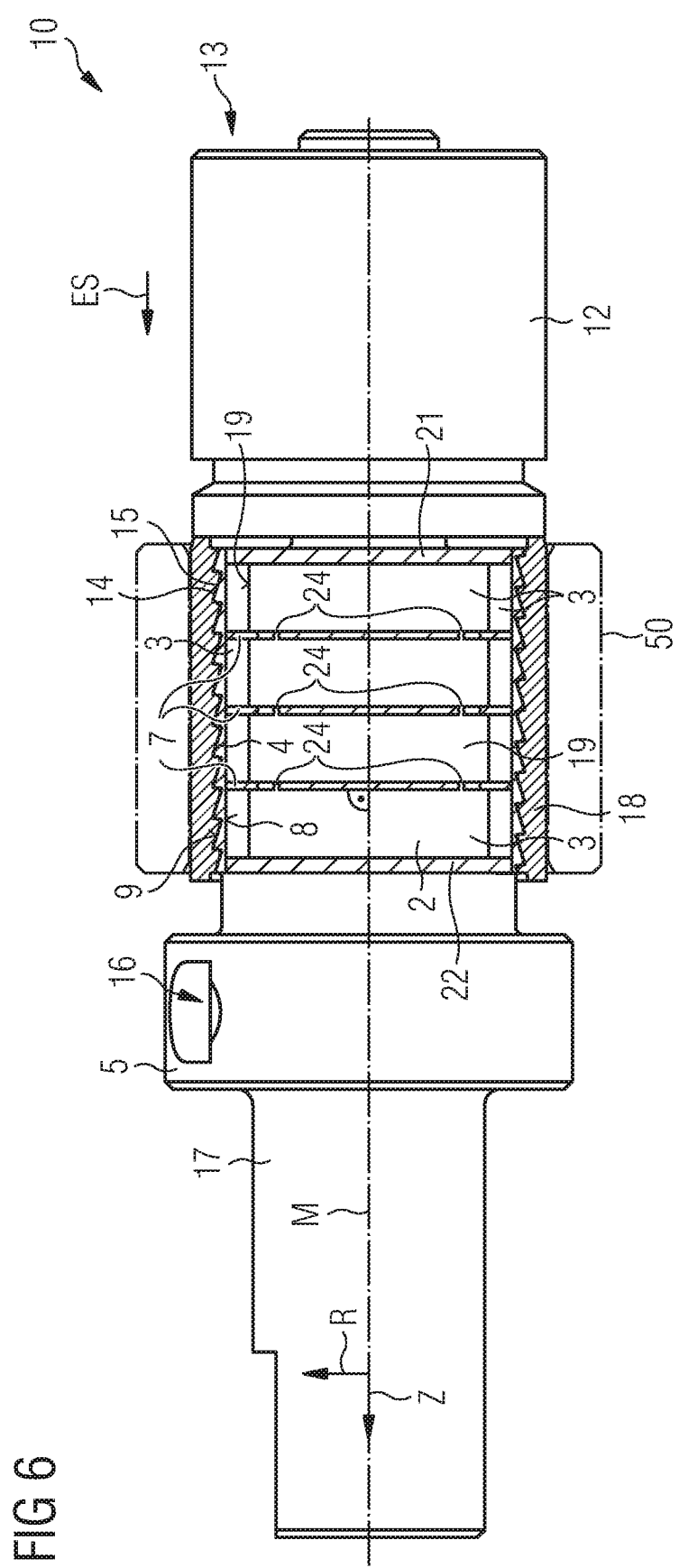
FIG. 6 shows a partially sectioned side view of a clamping device according to a third embodiment of the invention.
Figure 7:
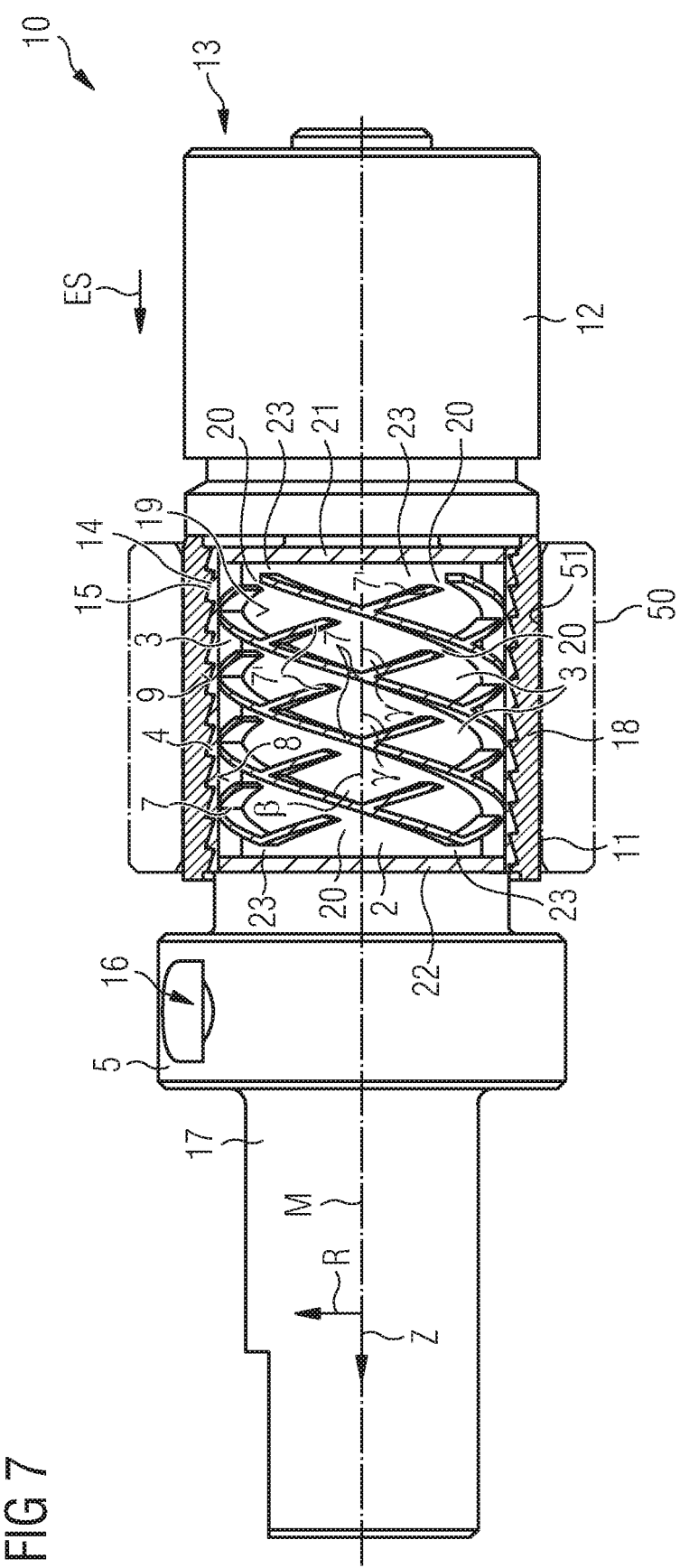
FIG. 7 shows a partially sectioned side view of a clamping device according to a fourth embodiment of the invention.

FIGS. 5, 6 and 7 show different exemplary embodiments for the design of the hydraulic chambers 3 and the intermediate webs 7 lying in between. The intermediate webs 7 can preferably extend or be arranged or realized on a shell 19, in particular a cylindrical shell, of the clamping body 2.

A plurality, for example three, intermediate webs 7 which each extend about the centre axis M in the form of a helical curve or in the manner of a thread or twisted at a pitch angle or angle of twist β to the centre axis M and are preferably arranged or realized on a cylindrical shell surface 19 of the clamping body 2, are provided in the exemplary embodiment in FIG. 5. The webs 7 are therefore realized in particular just as or similar to a multi-start, e.g. three-start, thread.

The membrane-like wall 8 with the support elements 14 is secured or connected or arranged and supported on the webs 7. Individual hydraulic chambers 3, which are open between the ends 23 of the respective intermediate webs 7 or are provided with openings 20, are formed between the webs 7 such that the fluid hydraulic medium is able to pass into each of the chambers 3 or the chambers 3 are in fluidic communication or flow connection with one another.

Preferred values for the pitch or angle of twist β are between 40° and 80°, in particular between 50° and 70°. The pitch or angle of twist β can also change over the length of the webs 7. The pitch or angle of twist β is adapted in an expedient manner to the pitch angle of the support surfaces or support elements such that the pitch of the webs matches the pitch PSG.

In addition, it is possible to provide just one continuous helically curved web 7, in particular in the form of a single-start thread, such that an opening 20 is only provided at the start and at the end of the continuous chamber 3 which lies in the space of the web 7 and is also twisted or helical.

Said embodiments with helically curved or twisted webs 7 have the advantage of linear contacts being realizable and above all of the webs being able to follow the threads or screw forms of the support surfaces or support elements and consequently achieving a comparatively sturdy structure with uniform force distribution. In the case of multi-start embodiments with a plurality of, i.e. two or more, webs which extend side by side, a more uniform force distribution is achieved over the circumference.

In the exemplary embodiment according FIG. 6, the intermediate webs 7 are realized substantially in the shape of a ring or in a closed manner per se between the hydraulic chambers 3 and are arranged extending perpendicularly to the centre axis M. The chambers 3 are therefore correspondingly hollow cylinder segments about the centre axis M. To fill the chambers 3, openings 24, through which the individual chambers 3 communicate fluidically with one another, are provided in the intermediate webs 7. The openings 24 are in particular small in relation to the length of the webs 7. The advantage of such ring-shaped hydraulic chambers 3 consists in that they are circumferential and are easily producible.

The webs 7 once again support the membrane-shaped wall 8, in said embodiment in the identical axial position over the entire circumference.

FIG. 7 now shows a further exemplary embodiment with webs 7 and 7' which extend in a crossed manner. First intermediate webs 7, which are once again arranged in a twisted manner or along a helical line at an angle of inclination or angle of twist β to the centre axis M, are provided. Second intermediate webs 7', which are connected to the first intermediate webs 7 at intersection points or connection points and jut out from the first intermediate webs 7 and, with reference to the centre axis M, extend in a twisted manner inclined in the opposite direction to the first intermediate webs 7 at a pitch or angle of twist γ to the centre axis M. The webs 7 and 7' preferably intersect at the angle 180°−β−γ in an acute angle or β+γ in an obtuse angle. Preferred values for the pitch or angle of twist β or the pitch or angle of twist γ are each between 40° and 80°, in particular between 50° and 70°. In particular, β=γ applies.

Openings 20, through which the hydraulic chambers 3, which are defined by two webs 7 on the one side and by two webs 7' on the other side, are connected fluidically with one another, and are formed between the ends of the first intermediate webs 7 and of the second intermediate webs 7. Such a net-like or crossed arrangement of webs results in the clamping membrane or wall 8 being supported in a particularly sturdy manner with the support elements 14.

By means of the structures according to FIG. 7, it is also possible to create cushion-shaped expansion zones. Cushion-shaped means in this case that not one expansion zone is provided entirely in the circumferential direction, but that a plurality of expansion zones can be provided one behind another in the circumferential direction. The expansion zones created by the honeycomb-shaped or net-like structure of the webs 7 and 7' appear in particular on the wall 8 as diamond-shaped or honeycomb-shaped expansion zones and many point contacts are realized. Other designs such as cylinder segments or oval forms, among others, are also possible.

The pitch of the webs 7 and of the chambers is preferably a multiple of PSG, in order to achieve good distribution onto the support surfaces, but is dependent on the deformation of the workpiece and can be adjusted variously:

for example, an incision or a recess can be provided in the workpiece in regions that are not to be deformed or are only to be slightly deformed such that no clamping by the clamping bush is obtained there or the hydraulic expansion does not result in a compressive force there.

Figure 8:
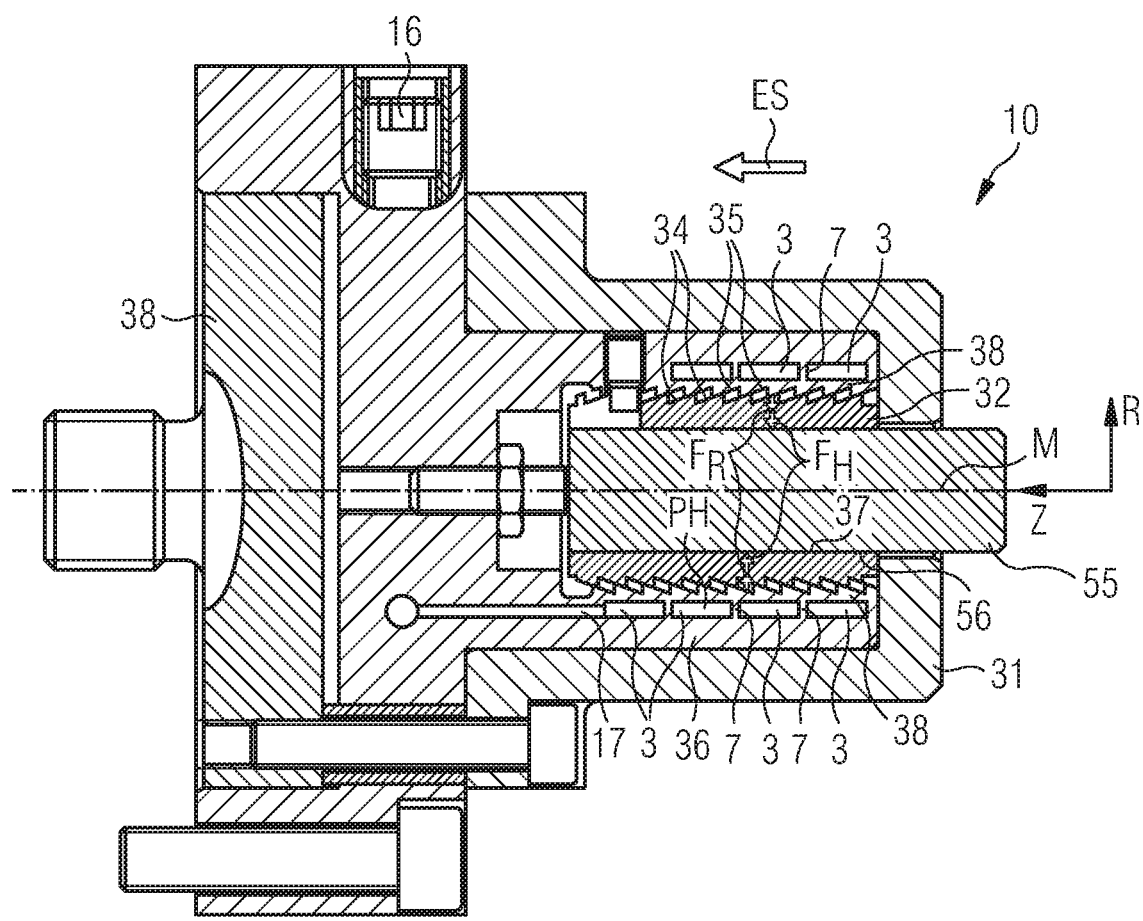
FIG. 8 shows a partially sectioned side view of a clamping device according to a fifth embodiment of the invention.

FIG. 8 then shows an exemplary embodiment of a clamping of a tool 55, wherein the clamping device 10 is realized as a clamping chuck. An outer clamping surface 56 of the tool 55 is clamped in a now inside clamping surface 37 of a clamping bush 32. The clamping bush 32 is once again moved mechanically into pre-clamping by means of interacting support elements 34 on the clamping bush 32 and support elements 35 on a clamping body 36 which surrounds the clamping bush 32, preferably coaxially to the centre axis M, for generating a mechanical radial clamping force FR, which then points inward here. Hydraulic chambers 3, which are separated from one another once again by webs 7 and which can be impinged upon with hydraulic pressure pH via the hydraulic channel 17 and the hydraulic pressure generator 16, are additionally provided in the clamping body 33. As a result, the thin wall 38 between the chambers 3 and the support elements 35 of the clamping body 36 is pressed inward and finally generates the hydraulic clamping force FH on the clamping surfaces 37 of the clamping bush 32 and 56 of the tool 55. The arrangement of the chambers 3 and of the intermediate webs 7 can also be effected in different variants analogously to FIGS. 5 to 7, the webs 7 or also 7' then being provided in each case on the inside and not on the outside of the clamping body 36.

End-face walls of the clamping body 2 are designated in FIGS. 5, 6 and 7 with the references 21 and 22. A stop surface of a clamping element 12 once again preferably abuts against the clamping bush 18, which clamping element can be displaced axially in the clamping movement direction ES by means of an actuator, for example a threaded pin 13, and, as a result, an axial force is exerted on the clamping bush 18, by way of which the support elements 15 of the clamping bush 18 can be displaced axially in relation to the support elements 14 of the clamping body 2, as has already been explained by way of FIGS. 1 and 2. As a result, the radial compressive force FR is generated between the support elements 14 and 15 and this once again generates a radial non-hydraulic or purely mechanical clamping force on the clamping surfaces 11 and 51.

In all exemplary embodiments the hydraulic pressure pH in the hydraulic chambers 3 generates a pressure on the wall 8 or 38 with the support elements 14 or 34 which ultimately leads to a hydraulic clamping pressure or a hydraulic clamping force on the clamping surfaces 11 and 51 between the clamping bush 18 and the workpiece 50 or tool 55.

The radial compressive force FR, which is generated by the mechanical insertion movement and the corresponding radial material clamping and deformation of the clamping bush 18, is supplemented or (vectorially) superimposed by the hydraulic radial force FH on account of the hydraulic pressure pH in the chambers 3 such that a resultant radial clamping force FR+FH is produced. Said resultant radial clamping force FR+FH corresponds to a clamping of the workpiece or tool both by the mechanical pre-clamping as a result of the insertion movement ES and by the hydraulic clamping by means of the hydraulic pressure pH in the hydraulic chambers 3 and the resultant hydraulic clamping force FH.

Generally speaking, the insertion movements to generate the radial mechanical clamping force FR and the hydraulic pressure pH are matched to one another such that the hydraulic clamping force FH is greater than the mechanical clamping force FR. In particular, FH>2FR, preferably FH>4FR. The hydraulic clamping force FH can, however, also still be clearly higher than the mechanical clamping force FR, for example up to a factor of 100. A typical value for the hydraulic clamping force FH would be approximately 20% of the necessary holding force. Consequently, only light mechanical pre-clamping is provided in this embodiment via the support elements 14 and 15 or 34 and 35 and the essential or primary clamping force is generated hydraulically. Consequently, in particular an axial stop for the workpiece as in the prior art according to FIG. 1 is also no longer absolutely necessary.

The web 7 is located in a preferred manner in the rear region of the saw tooth of the clamping body 2 so that the deformability/the radial path is ideal and the webs end on the free surface (see FIG. 8).

Figure 9:
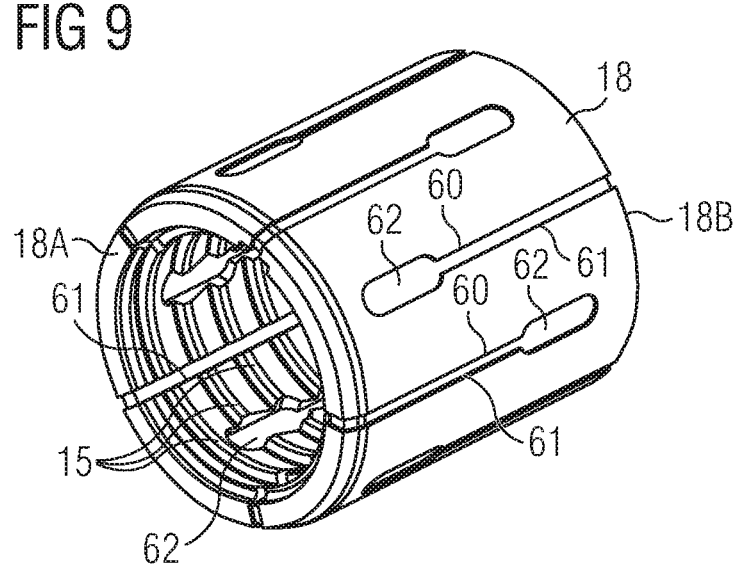
FIG. 9 shows a perspective view of a first embodiment of a slotted clamping bush.
Figure 10:
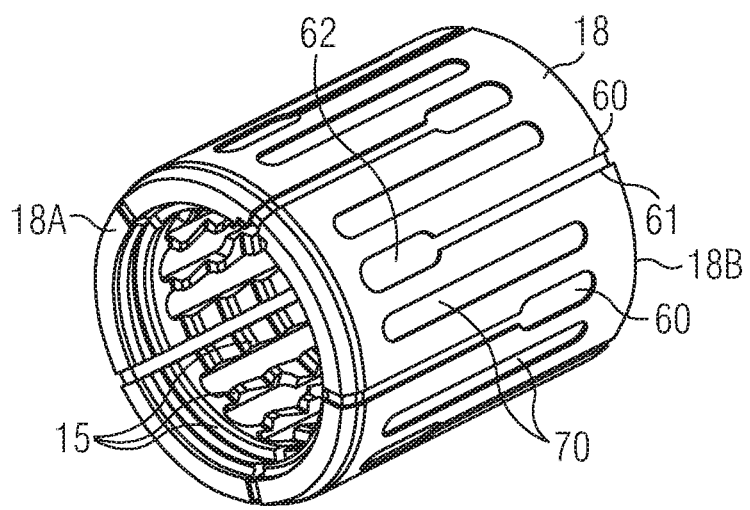
FIG. 10 shows a perspective view of a second embodiment of a slotted clamping bush.
Figure 11:
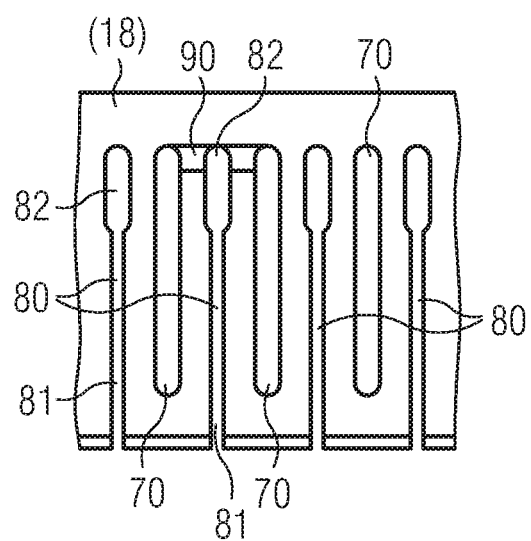
FIG. 11 shows a top view of a flattened part wall of a slotted clamping bush and FIG. 12 shows a cross section of a clamping device with a slotted clamping bush.

FIGS. 9 to 11 show slotted clamping bushes 18 as part of a or for using a clamping device according to the invention, which comprises a slotted wall with individual slots 60, which extend in particular substantially axially to a centre axis of the clamping bush 18.

In FIG. 9, each slot 60 comprises, in particular, a narrower slot 61 and a widened slot (or: widening) 62, the widened slot 62 forming a closed end of the slot 60 and the first slot 61 on an end face 18A or 18B of the clamping bush 18 ends in an open manner or opens out or comprises an open end at that point.

In this case, in the embodiment according to FIG. 9, the slots 60 are realized alternating or in each case opening out on oppositely situated end sides 18A and 18B or, in other words, the closed ends of the slots 62 each point in opposite axial directions.

In a preferred manner, the slots 60 are identically distributed or are arranged at the same separation angles to one another, for example with six slots, a separation angle of 60° being possible or with twelve slots, a separation angle of 30° being possible. The separation angles can also be different in all embodiments.

In addition, the slots 60 can also extend axially in each case beginning from the identical end side 18A so that their closed ends each point in the same axial direction.

Finally, it is also possible in all embodiments for the slots 60 not to comprise any widening 62, but to comprise in a substantially continuous manner the same width or even a smaller or differently formed widening on its closed end.

As a result of the slots 60, in particular the meandered wall of the clamping bush 18 obtained according to FIG. 9, it is possible to clamp the clamping bush 18 radially in a particularly uniform manner.

The clamping bush 18 once again comprises the support elements 15 on the inside wall, which support elements extend in particular along a thread or a helical curve and, as can be seen in FIG. 9, are interrupted in each case at least in part by the slot 60.

In FIG. 10, proceeding from a clamping bush according to FIG. 9, a slot 70 which is closed on both sides is now additionally arranged between in each case two slots 60 which are open on one side, it being possible for the slot 60 to be in particular wider than the narrower slot 61 of the slot 60 and in particular can be approximately just as wide as the widening 62 of the slot 60. The angular distances between the slots 61 to one another and the slots 70 to one another are once again in particular uniformly distributed and all slots 60 and 70 extend once again in particular axially or parallel to the centre axis of the clamping bush 18.

FIG. 11 then shows similarly to FIG. 10, but simply in a representation of a shell flattening, a realization with slots 80 which are open on one side and once again comprise a narrower slot 81, which opens out on an end side, and a closed end arranged in the opposite direction in an axial direction on a widened slot 82, in contrast to FIGS. 9 and 10 said one-sided open slots 80 now opening out in each case on the identical end side of the clamping bush 18 or with their closed ends pointing in each case in the identical axial direction. Slots 70 closed at both ends are once again arranged between the slots 80, similar to in FIG. 10.

Three adjacent slots, in particular two slots 70 and one slot 80 lying in between, this one in particular in the region of its widened slot 82, can also be connected together in part by a transversely extending slot 90 which forms a type of T connection. The slot 90 therefore extends in the circumferential direction about the centre axis of the clamping bush 18.

The slots 80 in FIG. 11 can also be realized without any widening 82 and naturally also the angular distances, which are shown in FIG. 11 as planar distances in the flattening, can be realized identically or variously.

Figure 12:
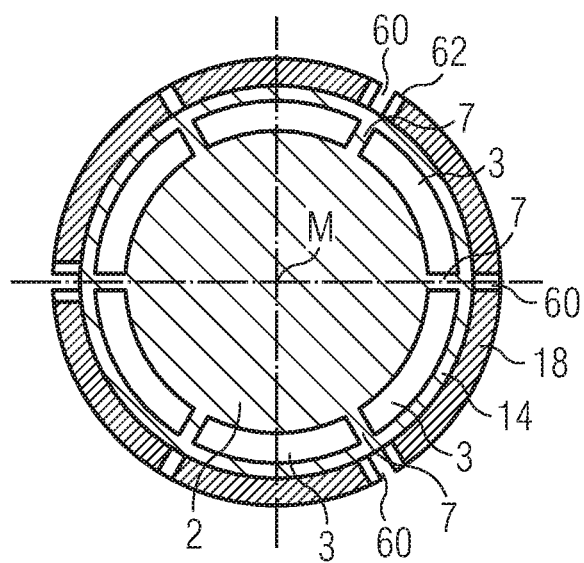

FIG. 12 then shows a cross section of a slotted clamping bush 18 mounted on the clamping body 2. A plurality of hydraulic chambers 3 are shown which are realized in the form of hollow cylinder segments which extend axially and in the cross section in FIG. 12 are consequently shown as ring segments. Between the hydraulic chambers 3 are once again formed in each case webs 7, which then, as can be seen in FIG. 12, support the outer region of the clamping body 12, which forms the support elements 14, directly below the slots 60. As a result, by means of the hydraulic expansion when the hydraulic chambers 3 are impinged upon with hydraulic pressure, the slotted clamping bush 18 is nevertheless radially expanded the least in its most flexible region of the slots 60, but rather primarily the wall regions of the clamping bush 18 lying between the slots 60 are expanded outward in order to move into abutment with the workpiece in order to clamp it.

The underlying concept of said embodiment therefore consists in supporting a slotted clamping bush with the webs or support webs at least in part at the point where the slots are formed. If, therefore, the slots comprise a different design or do not extend axially, the support path will also follow said progression at least in part. Diverse variants of the slot shapes and of the support webs following them at least in part are conceivable here. For example, the slots of the clamping bush can also be arranged in an arrangement according to DE 20 2011 050 998 U1 or DE 20 2011 051 001 U1.

In all embodiments, hydraulic chambers 3 can be provided either in the clamping body or in the clamping bush or also in both.

In a preferred manner, the clamping device, in particular the clamping body is produced in a 3D printing process.

LIST OF REFERENCES

1 Clamping device
2 Clamping body
3 Hydraulic chamber
4 Support element
5 Ring body
6 Wall
7 Clamping body
8 Wall
10 Clamping device
11 Clamping surface
12 Clamping element
13 Threaded pin
14 Support element
14A Support surface
15 Support element
15A Support surface
16 Pressure generator
17 Shank part
18 Clamping bush
18A, 18B End face
19 Shell surface
20 Openings
21, 22 End wall
24 Openings
30 Clamping chuck
31 Mechanical clamping element
32 Clamping bush
34 Support element
35 Support element
36 Clamping body
37 Clamping surface
38 Wall
50 Workpiece
51 Counter clamping surface
55 Tool
M Centre axis
ES Clamping movement direction
R Radial direction
Z Axial direction
a1, a2 Length
b Height
c Axial distance
d Thickness
e Radial distance
ES Insertion movement direction
FES Clamping force
FR Radial mechanical pressing/clamping force
FH Radial hydraulic pressing/clamping force
PSG Pitch
pH Hydraulic pressure
ΔZ Displacement path
ΔR Radial path
α Angle of inclination
β Angle of twist

I claim:
1. A clamping device for clamping a workpiece or a tool and in particular for coupling the workpiece or the tool to a machine spindle, including:
   a) at least one clamping bush which extends around a central axis (M) and has at least one clamping surface for the workpiece or tool and
   b) at least one clamping body,
   c) wherein the clamping bush on a side remote from the clamping surface comprises at least one support surface which extends about the central axis along a helical line and at the same time is inclined at an angle of inclination ($\alpha$) to a direction (Z) which is axial to the central axis (M),
   d) wherein the clamping body, on a side facing the clamping bush comprises at least one support surface which extends about the central axis (M) along a helical line and at the same time is inclined at an angle of inclination ($\alpha$) to a direction (Z) which is axial to the central axis (M),
   e) wherein at least one of (i) the clamping body or (ii) the clamping bush includes at least one hydraulic chamber positioned in an interior thereof, the at least one hydraulic chamber being filled with a hydraulic medium, f) additionally including at least one displacement element in order to move the support surfaces, which face one another, of the clamping body and clamping bush into contact with one another by moving them slidingly towards one another as a result of an axial displacement movement along an axial displacement path (ΔZ) in the axial direction (Z), as a result of which a diameter of the clamping surface is modifiable in a direction (R) radial to the central axis (A), such that with a clamping surface already abutting against the workpiece a radial mechanical clamping force ($F_R$) is generated between the clamping bush on the one hand, and workpiece on the other hand, g) additionally including at least one pressure generator in order to impinge upon the hydraulic medium in the at least one hydraulic chamber with hydraulic pressure ($p_H$) which, with the support surfaces of clamping body and clamping bush lying one on top of the other, generates a radial hydraulic compressive force ($F_H$) on the support surfaces of clamping body and clamping bush lying one on top of the other, wherein, as a result of the radial hydraulic compressive force ($F_H$), with a clamping surface already abutting against the workpiece a radial hydraulic clamping force ($F_H$) is generated between the clamping bush on the one hand, and workpiece on the other hand.

2. The clamping device according to claim 1, wherein at least one of:
the hydraulic clamping force ($F_H$) is generated in addition to the mechanical clamping force ($F_R$) and is rectified to the mechanical clamping force ($F_R$); and
the amount of hydraulic clamping force ($F_H$) is adjustable to at least 2 times the mechanical clamping force ($F_R$).

3. The clamping device according to claim 1, wherein:
corresponding support surfaces of clamping body and clamping bush, as a result of a screwing movement into one another adapted to a pitch thereof, are movable into an engagement position in which the support surfaces: (i) lie opposite one another at least in part, and (ii) are moved into contact; and
the axial displacement movement to generate the radial mechanical clamping force ($F_R$) is effected from said engagement position and an impinging of the chamber or chambers with the hydraulic pressure ($p_H$) is then effected by means of the pressure generator to generate the hydraulic clamping force ($F_H$).

4. The clamping device according to claim 1, wherein a plurality of intermediate webs are arranged between a plurality of the hydraulic chambers.

5. The clamping device according to claim 4, wherein an axial dimension (d) of the intermediate webs is smaller by at least a factor of 4, than an axial dimension (a1) of the chambers.

6. The clamping device according to claim 4, wherein the intermediate webs are arranged below the support surface or support surfaces at an axial distance which corresponds to at least double the pitch of a pitch of the support surface or support surfaces.

7. The clamping device according to claim 4, wherein:
at least one of the intermediate webs extends in a closed manner like a ring about an entire circumference, in particular perpendicularly to the central axis (M).

8. The clamping device according to claim 4, wherein:
at least one of the intermediate webs extends spirally about the central axis (M), and at angles of twist which are directed in opposite directions to one another and which are between 40° and 80°.

9. The clamping device according to claim 4, wherein:
at least one of the intermediate webs only extends over part of the circumference.

10. The clamping device according to claim 4, wherein:
at least one of the intermediate webs extends or is arranged or realized on a shell surface, in particular a cylindrical shell surface, of the clamping body or of the clamping bush.

11. The clamping device according to claim 4, wherein:
the at least two intermediate webs are arranged in the shape of a diamond or of a honeycomb.

12. The clamping device according to claim 4, further comprising at least one of the following features:
a) the at least one of the plurality of hydraulic-chambers is fluidically connected to the at least one pressure generator via at least one hydraulic channel; and
b) at least two of the plurality of hydraulic chambers communicate fluidically with one another by means of intermediate channels or openings between the intermediate webs.

13. The clamping device according to claim 1, wherein:
a membrane-like wall of the clamping body or of the clamping bush, which is deformable or expandable in the radial direction with the support surface or the support surfaces as a result of the hydraulic pressure ($p_H$), is formed between the at least one chamber and the corresponding support surface; and
the membrane-like wall of the clamping body or of the clamping bush is supported on one or more intermediate webs.

14. The clamping device according to claim 1, wherein at least one of the chambers:
extends in a closed manner like a ring about the entire circumference, and perpendicularly to the central axis (M).

15. The clamping device according to claim 1, wherein at least one of the chambers:
extends spirally, and about the central axis (M).

16. The clamping device according to claim 1, wherein at least one of the chambers:
extends only over part of the circumference in a cushion shape.

17. The clamping device according to claim 1, further comprising at least one of the following features:
a) the chambers have a radial dimension or height (b) which is greater by at least the factor of 2.5 than a radial thickness (e) of the membrane-like wall;
b) having axially inside chambers wherein at least the axially inside chambers have the identical axial dimension (a1);
c) having axially outside chambers wherein the axially outside chambers have a smaller axial dimension (a2) than the axial dimension (a1) of the axially inside chambers;
d) the axial dimensions (a1, a2) of the chambers are greater than a pitch of the support surface or support surfaces but smaller than double the pitch (PSG); and
e) the chamber or chambers has or have a rectangular cross section in an axial section.

* * * * *